US012135101B2

(12) United States Patent
Goeschel et al.

(10) Patent No.: US 12,135,101 B2
(45) Date of Patent: Nov. 5, 2024

(54) PLUMBING ADAPTER

(71) Applicant: MAG Aerospace Industries, LLC, Carson, CA (US)

(72) Inventors: Christoph Goeschel, Seattle, WA (US); Mario Nakhla, La Mirada, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 126 days.

(21) Appl. No.: 17/639,995

(22) PCT Filed: Sep. 11, 2020

(86) PCT No.: PCT/US2020/050469
§ 371 (c)(1),
(2) Date: Mar. 3, 2022

(87) PCT Pub. No.: WO2021/050926
PCT Pub. Date: Mar. 18, 2021

(65) Prior Publication Data
US 2022/0325831 A1 Oct. 13, 2022

Related U.S. Application Data

(60) Provisional application No. 62/898,750, filed on Sep. 11, 2019.

(51) Int. Cl.
*F16L 27/08* (2006.01)
*B64D 11/02* (2006.01)

(52) U.S. Cl.
CPC .......... *F16L 27/0849* (2013.01); *B64D 11/02* (2013.01)

(58) Field of Classification Search
CPC ....... F16L 37/18; F16L 37/242; F16L 37/103; F16L 27/00; F16L 27/08; F16L 27/0804
(Continued)

(56) References Cited

U.S. PATENT DOCUMENTS 1,304,979 A * 5/1919 Hirshstein ............... F16L 25/14
220/3.7

FOREIGN PATENT DOCUMENTS

EP 1411219 A2 4/2004
FR 2307211 A1 11/1976
(Continued)

OTHER PUBLICATIONS

Translation DE 2616072 (Year: 1976).*
(Continued)

*Primary Examiner* — Aaron M Dunwoody

(74) *Attorney, Agent, or Firm* — Kilpatrick Townsend & Stockton LLP

(57) ABSTRACT

A plumbing adapter for use in connecting two plumbing interfaces to one another. The plumbing adapter, which is configured to move between multiple positions in order to accommodate any misalignment between the two plumbing interfaces, comprises a base frame (22) supporting an inner ring (12) and an outer ring (14), wherein the inner ring (12) inner diameter defines a first central longitudinal axis (16), wherein the outer ring (14) inner diameter defines a second central longitudinal axis (18), wherein the inner ring and the outer ring are both rotatable within the base frame such that the first central longitudinal axis (16) and the second central longitudinal axis (18) can be moved with respect to one another in order to accommodate for misalignment between the first plumbing interface and the second plumbing interface.

10 Claims, 6 Drawing Sheets

(58) Field of Classification Search
USPC .................................................. 285/148.27
See application file for complete search history.

(56) References Cited

FOREIGN PATENT DOCUMENTS

| GB | 2463936 A | | 4/2010 |
|---|---|---|---|
| HU | DT 2616072 | * | 4/1976 |
| WO | 2014081912 A2 | | 5/2014 |

OTHER PUBLICATIONS

International Patent Application No. PCT/US2020/050469, International Search Report and Written Opinion, dated Dec. 14, 2020.
Europe Appl. No. 20780522.7, Office Action, Jan. 12, 2024, 5 pages.

* cited by examiner

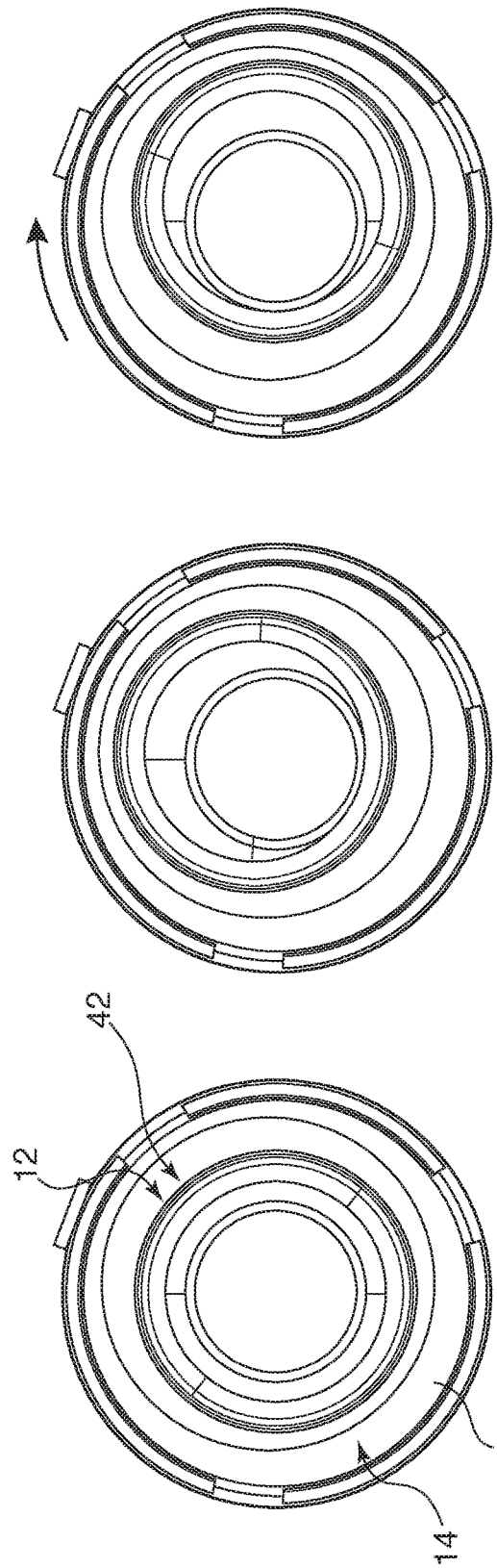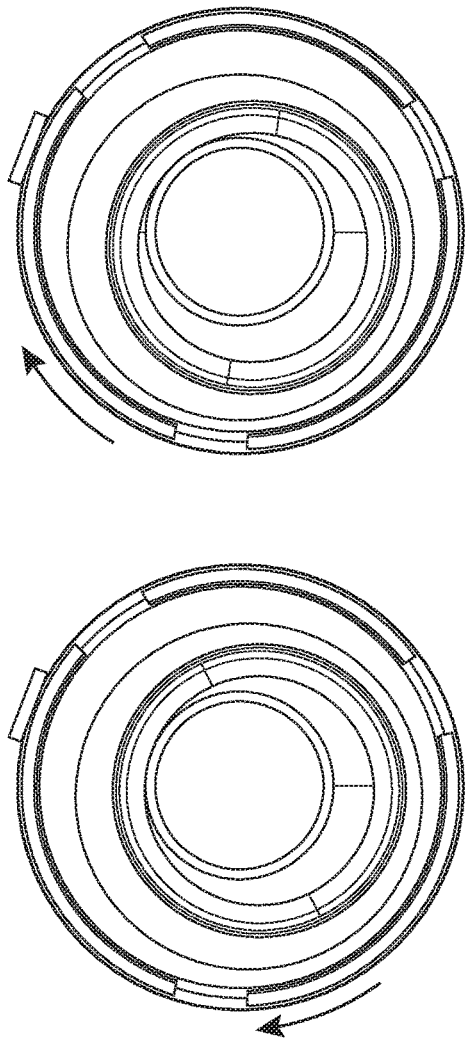

PLUMBING ADAPTER

This application claims the benefit of U.S. Provisional Application Ser. No. 62/898,750, filed Sep. 11, 2019 titled "Plumbing Adapter," the entire contents of which are hereby incorporated by reference.

FIELD OF THE DISCLOSURE

According to certain embodiments of this disclosure, there is provided a plumbing adapter for use in connecting two plumbing interfaces to one another. The plumbing adapter is configured to move between multiple positions in order to accommodate any misalignment between the two plumbing interfaces.

BACKGROUND

Commonly, misalignment in plumbing lines may be addressed by using flexible components. For example, if a first plumbing interface is mounted such that it is offset from a corresponding plumbing interface to which it should connect, a flexible rubber or silicone component may be used to bridge the offset/gap connection. However, such components may have connections that provide only limited adaptability. Accordingly, improved plumbing adapters are desirable.

SUMMARY

Accordingly, the present inventors have designed a plumbing adapter that can be used to compensate for misalignment between two plumbing interfaces. In one example, the plumbing adapter has a base frame supporting an inner ring and an outer ring, wherein the inner ring inner diameter defines a first central longitudinal axis, wherein the outer ring inner diameter defines a second central longitudinal axis, wherein the inner ring and the outer ring are both rotatable within the base frame such that the first central longitudinal axis and the second central longitudinal axis can be moved with respect to one another in order to accommodate for misalignment between the first plumbing interface and the second plumbing interface. The inner ring can have a wider portion and the outer ring can have a wider portion, which allows for eccentricity of the rings with respect to the base frame. The inner ring is generally provided with a raised shoulder that cooperates with the first plumbing interface. The base frame may have one or more securement features that cooperate with the second plumbing interface.

In a specific example, the base frame may have an outer groove that receives an external edge of the outer ring. The base frame may also have an inner groove that receives the inner ring. At least one gasket seal may be used to help maintain the rings in position with respect to one another and to prevent leakage. One or more O-ring seals may also be used.

In another specific example, the first plumbing interface may be a ball valve of an aircraft waste tank, and the second plumbing interface may be an aircraft service panel.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

FIGS. 5A-5E show top plan views of a plumbing adapter with the inner ring being rotated around the base frame.

DETAILED DESCRIPTION

Embodiments of the present disclosure provide a plumbing adapter that can be used to compensate for misalignment between two plumbing interfaces. In a specific example, a first plumbing interface may be mounted such that it is offset from a second plumbing interface to which it should connect. In one example, this may occur in connection with an aircraft waste tank. The waste tank typically has a ball valve at its outlet, and the ball valve connects the waste tank to a service panel. If the ball valve and the service panel are not perfectly aligned in the same plane (i.e., they do not share the same central longitudinal axis), the disclosed plumbing adapter may be used in order to compensate for the misalignment.

Figure 1:
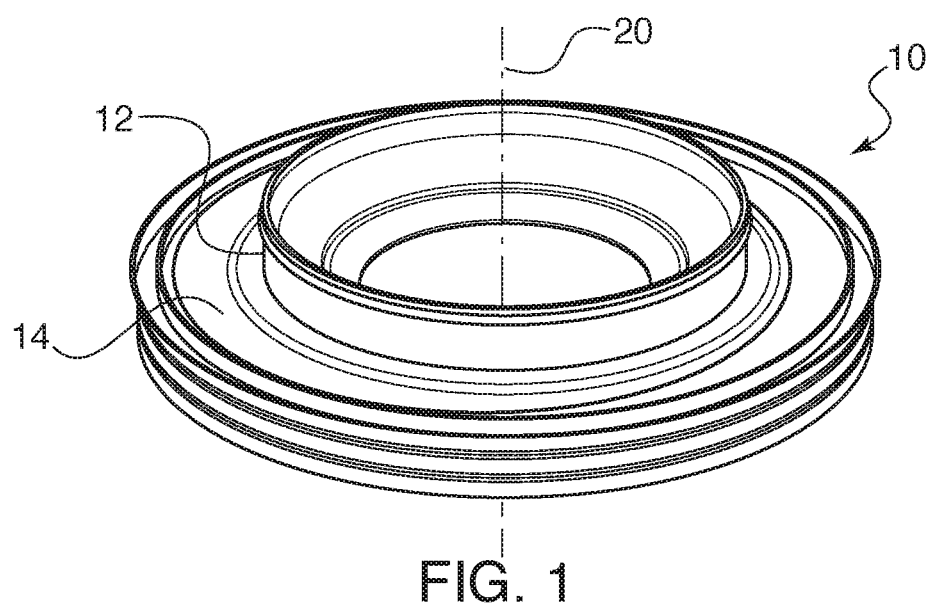
FIG. 1 shows a side perspective view of one embodiment of a plumbing adapter.
Figure 2A:
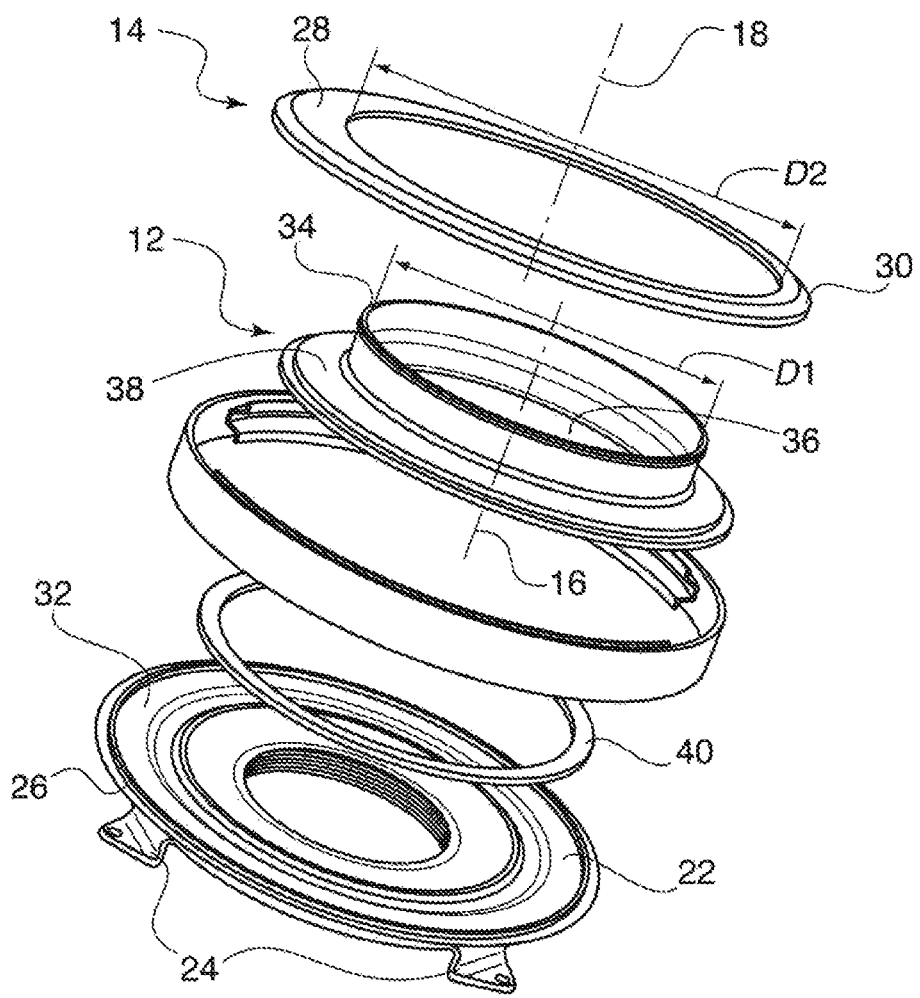
FIG. 2A shows an exploded perspective view of the plumbing adapter of FIG. 1.
Figure 2B:
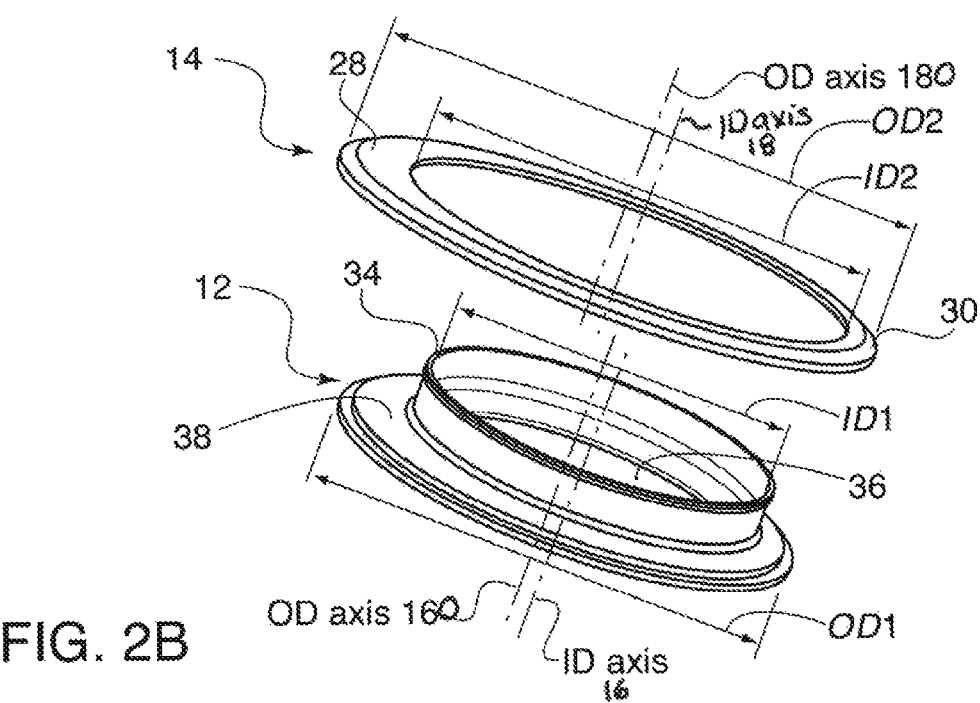
FIG. 2B shows a close up view of the inner and outer diameters of the inner and outer rings.
Figure 3:
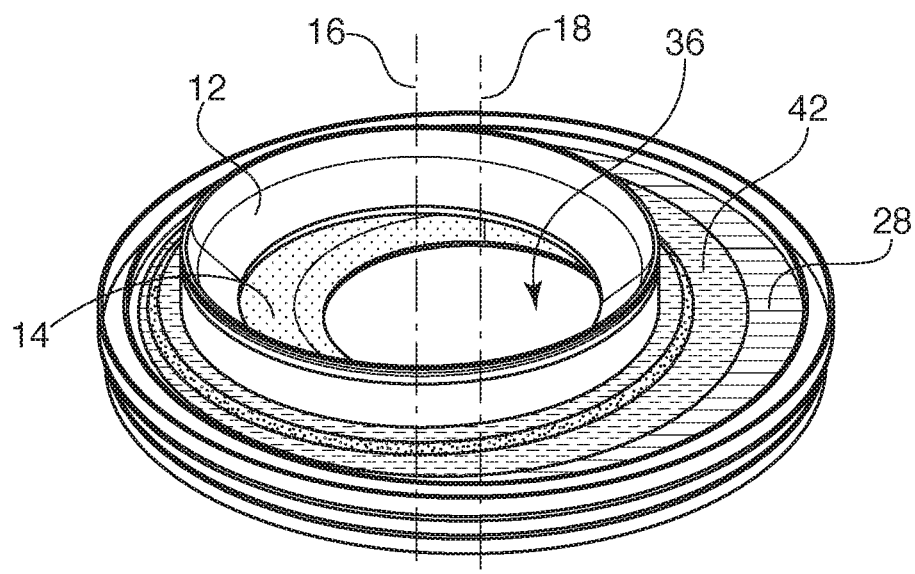
FIG. 3 shows a side perspective view of the plumbing adapter of FIG. 1 with the inner ring rotated.

Referring now to FIGS. 1-5, the plumbing adapter 10 is shown having non-concentric rings 12, 14. The inner ring 12 has a first inner diameter ID1 with a first central longitudinal axis 16 and an outer diameter OD1 with axis 160. The axis 160 drawn through OD1 is offset from the first central longitudinal axis 16 of ID1. The outer ring 14 has its inner diameter ID2 with a second central longitudinal axis 18 and an outer diameter OD2 with axis 180. The axis 180 drawn through OD2 is offset from the second central longitudinal axis 16 of OD1. This is due to the eccentricity of each ring's perimeter, described below. These inner and outer diameters of the inner and outer rings are shown in detail by FIG. 2B. Whether the inner ring 12 and the outer ring 14 are centered or not centered with respect to one another, the longitudinal axes 16, 18 are offset from one another, as shown by FIG. 3.

As shown by FIG. 2, both of the rings 12, 14 are mounted with respect to a base frame 22. The base frame 22 may have securement features 24 that allow it to be secured with respect to an aircraft service panel or other plumbing interface. The base frame 22 may have an outer groove 26 which is sized and shaped to receive the outer ring 14. As shown, the outer ring 14 may be eccentric, such that there is a first portion 28 of the outer ring 14 that is a wider (defining a wider portion 28) than a second portion 30. The base frame 22 may have an inner groove 32 which is sized and shaped to receive the inner ring 12. As shown, the inner ring 12 may also be eccentric. Referring more specifically to the features of the inner ring 12, the inner ring 12 has a raised shoulder 34 defining an interior perimeter 36. The interior perimeter 36 is the opening through which fluid will pass from a first plumbing interface to a second plumbing interface. The raised shoulder 34 cooperates with or connects to a first plumbing interface in order to create a liquid-tight seal. Movement of the inner ring 12 with respect to the base frame 22 causes movement of the raised shoulder 34.

The inner ring 12 also has an external flange 38, which sits within the inner groove 32. A gasket seal 40 may be provided in order to secure and seal components of the plumbing adapter 10 together. The external flange 38 may be eccentric. There may be a first portion 42 of the inner ring 12 that is a wider (defining a wider portion 42) than a second portion 44. This eccentricity means that when the inner ring 12 is rotated with respect to the base frame 22, the central longitudinal axis 16 of the inner ring 12 becomes offset from the central longitudinal axis 18 of the outer ring 14. This moves the cooperation or connection point of the plumbing adapter 10 with respect to the first plumbing interface.

Movement of the inner ring 12 allows for a certain tolerance to correct for any misalignment between the first and second interfaces. If movement of the inner ring 12 is not sufficient to correct for any misalignment between the plumbing interfaces, the outer ring 14 may also be rotated. The movement of the inner ring 12 and the outer ring 14 may occur in any order, for example, the outer ring 14 may be maneuvered first if desired. This combined movement of both rings 12, 14 can provide added tolerance to maximize the ability to manage a larger offset/misalignment.

In FIG. 3, both the inner ring 12 and the outer ring 14 are rotated to the left-most side of the base frame 22. This means that the wider portion 28 of the outer ring 14 and the wider portion 42 of the inner ring 12 are shown at the right-most side of the base frame 22.

This pushes the interior perimeter 36 as far as possible to the left. It should be understood that the rings 12, 14 may be rotated around so that the interior perimeter 36 is moved as far as possible to the right. This example shows how the location of the inner perimeter may be altered upon movement of the rings.

The rings move independently from one another. By rotating both rings, the axis 16 (of ID1) can assume any position normal to the plane of the wider area 28 in the area defined by maximum offset radius.

Figure 4:
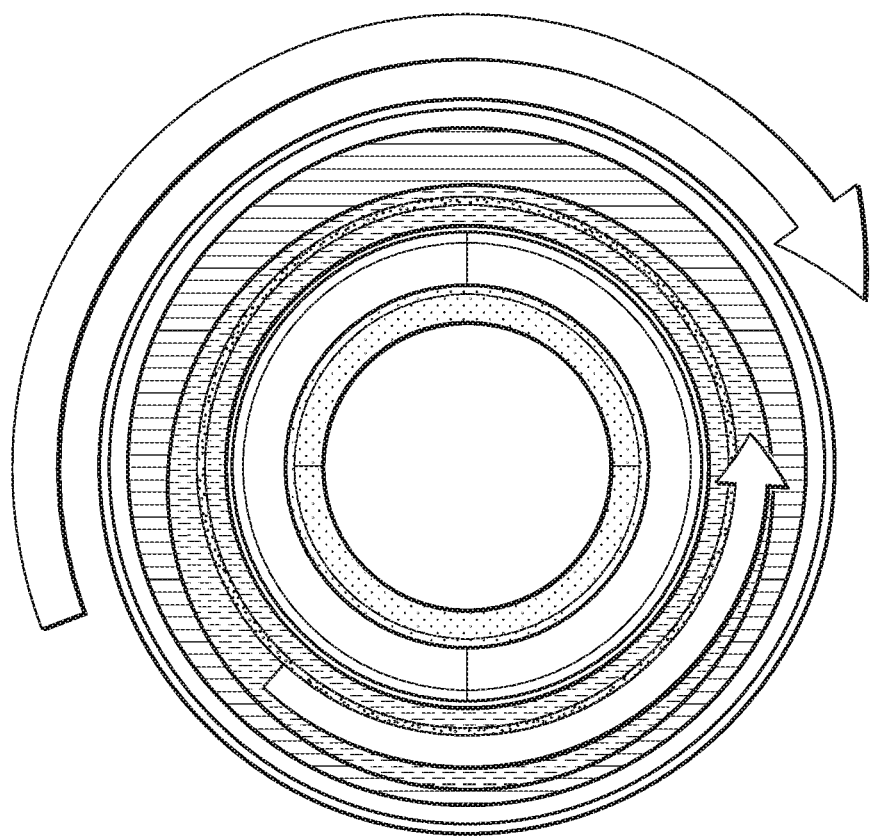
FIG. 4 shows a top plan view of a plumbing adapter.

FIG. 4 shows that the rings 12, 14 may be designed to be rotated in different directions, such that one ring rotates clockwise and another ring rotates counterclockwise.

FIGS. 5A-5E show an example of various ring rotation configurations. In FIG. 5A, the outer ring 14 has its wider portion 28 opposite from the wider portion 42 of the inner ring 12. This helps the rings align. In FIGS. 5B-5E, the outer ring 14 is not moved, but the inner ring 12 is being rotated clockwise.

Figure 6:
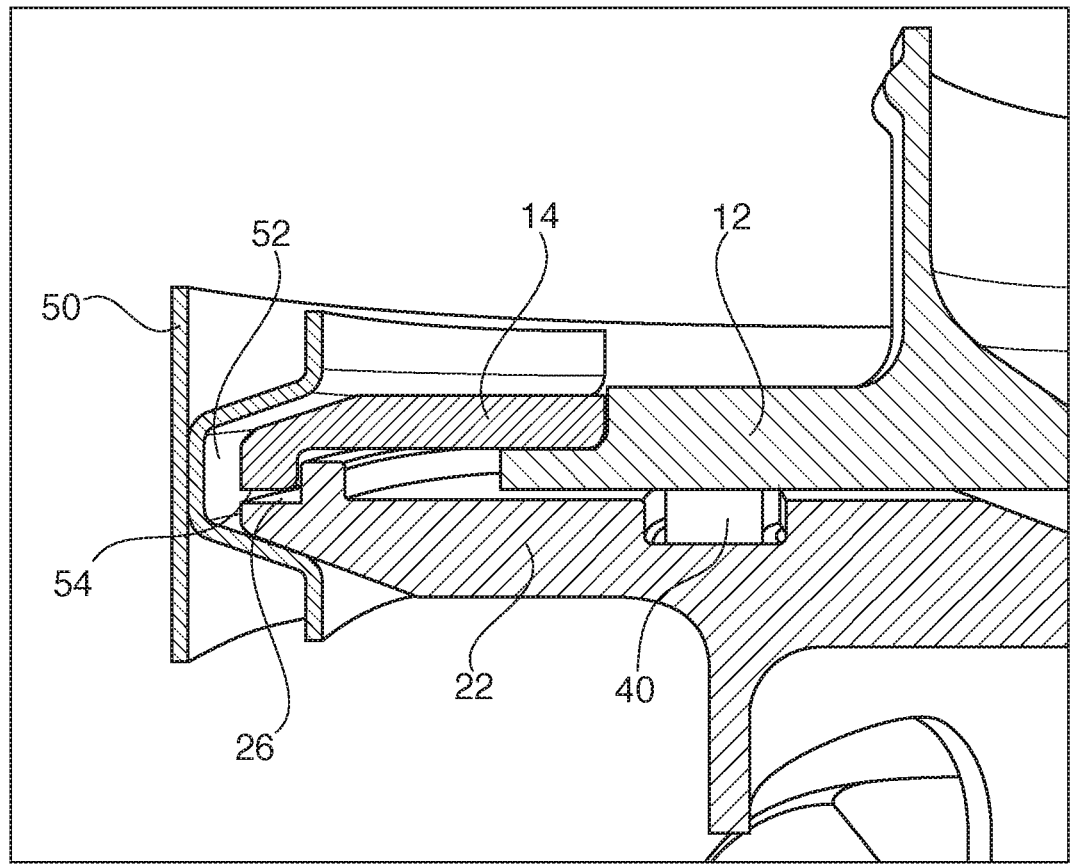
FIG. 6 shows a side cross-sectional view of a plumbing adapter edge with a V-band clamp in place.

FIG. 6 shows a side cross-sectional view of the base frame 22, the inner ring 12, and the outer ring 14 all secured in place with a V-band clamp 50. As shown, external edges of each of the base frame 22 and the outer ring 14 are shaped to cooperate so that they can fit within a V-seat 52 of the band clamp 50. In use, the V-seat 52 of the band clamp 50 would be tightened so that it clamps against the flanges. By tightening the V-Band 50, the force perpendicular to the V-profile will sandwich the components together, with gasket 40 providing additional resistance.

As shown, the outer groove 26 of the base frame 22 receives external edge 54 of the outer ring 14. Once the outer ring 14 has been positioned as desired, the V-band clamp 50 secures it in place with respect to the base frame 22. FIG. 6 also shows the presence of gasket seal 40. Once the V-band clamp 50 is positioned in place, its pressure secures the inner ring 12 in place, due to presence of the gasket seal 40.

Figure 7:
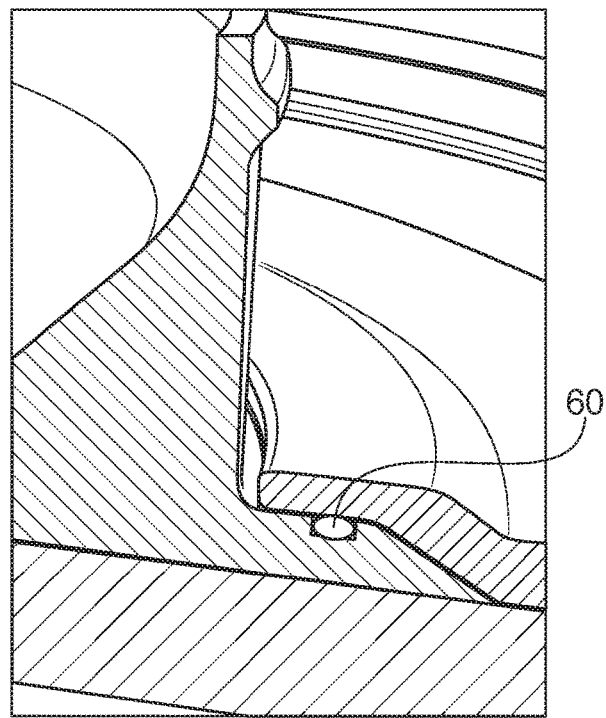
FIG. 7 shows a side cross-sectional view of an optional position of an O-ring seal in a plumbing adapter.

FIG. 7 illustrates that in addition to gasket seal, one or more O rings 60 may be used in order to seal the fluid exposed inside the plumbing adapter 10 to the ambient environment.

Figure 8:
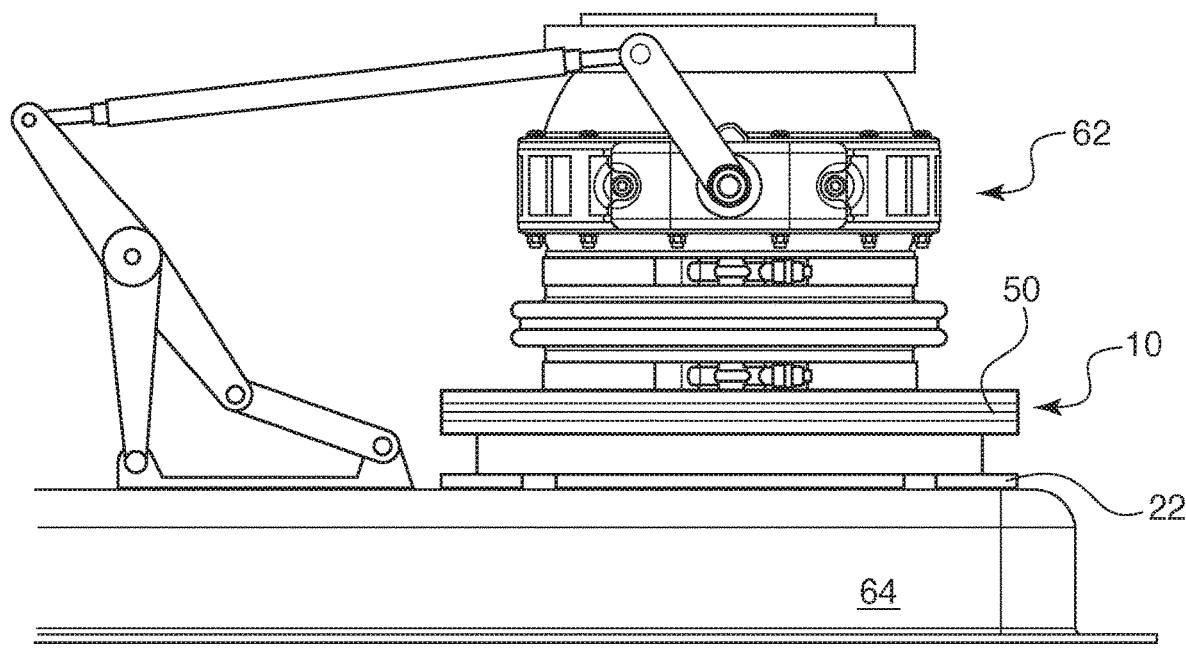
FIG. 8 shows a side plan view of a plumbing adapter used to connect first and second plumbing interfaces.

FIG. 8 illustrates a plumbing adapter 10 mounted with respect to a first plumbing interface, which, in this figure is a waste tank ball valve 62. The base frame 22 of the plumbing adapter 10 is mounted with respect to a second plumbing interface, which, in this figure is an aircraft service panel 64.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A plumbing adapter for use between a first plumbing interface and a second plumbing interface that are misaligned, the plumbing adapter comprising:
   a base frame supporting an inner ring and an outer ring,
      wherein an inner ring inner diameter defines a first central longitudinal axis,
   wherein an outer ring inner diameter defines a second central longitudinal axis,
   wherein the inner ring and the outer ring are both rotatable relative to the base frame such that the first central longitudinal axis and the second central longitudinal axis can moved with respect to one another in order to accommodate for misalignment between the first plumbing interface and the second plumbing interface,
   wherein the inner ring comprises a wider portion and wherein the outer ring comprises a wider portion, wherein the wider portions of the inner and outer rings allow for eccentricity of the rings with respect to the base frame, wherein the inner ring comprises a raised shoulder extending away from the wider portion of the inner ring in a direction along the first central longitudinal axis, wherein the raised shoulder is configured to cooperate with the first plumbing interface, and wherein a position of the raised shoulder may be controlled at least by rotating both the inner ring and the outer ring relative to the base frame.

2. The plumbing adapter of claim 1, wherein the base frame comprises one or more securement features configured to cooperate with the second plumbing interface.

3. The plumbing adapter of claim 1, wherein the base frame comprises an outer groove that receives an external edge of the outer ring.

4. The plumbing adapter of claim 1, wherein the base frame comprises an inner groove that receives the inner ring.

5. The plumbing adapter of claim 1, further comprising at least one gasket seal.

6. The plumbing adapter of claim 1, further comprising one or more O-ring seals.

7. A plumbing system comprising the plumbing adapter of claim 1, the first plumbing interface, and the second plumbing interface, wherein the first plumbing interface comprises a ball valve of an aircraft waste tank, wherein the second plumbing interface comprises a service panel.

8. The plumbing adapter of claim 1, wherein the position of the raised shoulder may further be controlled by rotating the inner ring relative to the outer ring or by rotating the outer ring relative to the inner ring.

9. A plumbing adapter for use between a first plumbing interface and a second plumbing interface that are misaligned, the plumbing adapter comprising:
a base frame comprising a first side and a second side;
an inner ring on the first side of the base; and
an outer ring on the first side of the base and at least partially overlapping the inner ring such that at the first side, a portion of the inner ring is between the first side and the outer ring,
wherein an inner ring inner diameter defines a first central longitudinal axis,
wherein an outer ring inner diameter defines a second central longitudinal axis,
wherein the inner ring and the outer ring are both rotatable relative to the base frame such that the first central longitudinal axis and the second central longitudinal axis can moved with respect to one another in order to accommodate for misalignment between the first plumbing interface and the second plumbing interface,
wherein the inner ring comprises a wider portion and wherein the outer ring comprises a wider portion, wherein the wider portions of the inner and outer rings allow for eccentricity of the rings with respect to the base frame,
wherein the inner ring comprises a raised shoulder extending away from the wider portion of the inner ring in a direction along the first central longitudinal axis outwards from the first side of the base frame, wherein the raised shoulder is configured to cooperate with the first plumbing interface.

10. A plumbing adapter for use between a first plumbing interface and a second plumbing interface that are misaligned, the plumbing adapter comprising:
a base frame comprising an outer groove and an inner groove;
an inner ring comprising an external flange received within the inner groove of the base; and
an outer ring comprising an external edge received within the outer groove of the base;
a gasket seal received within inner groove of the base; and
a V-band clamp which receives the external edge of the outer ring and an external edge of the base frame, wherein tightening of the V-band clamp secures the outer ring in place relative to the base frame and further secures the inner ring in place,
wherein an inner ring inner diameter defines a first central longitudinal axis,
wherein an outer ring inner diameter defines a second central longitudinal axis,
wherein the inner ring and the outer ring are both rotatable relative to the base frame such that the first central longitudinal axis and the second central longitudinal axis can moved with respect to one another in order to accommodate for misalignment between the first plumbing interface and the second plumbing interface,
wherein the inner ring comprises a wider portion and wherein the outer ring comprises a wider portion, wherein the wider portions of the inner and outer rings allow for eccentricity of the rings with respect to the base frame,
wherein the inner ring comprises a raised shoulder extending away from the wider portion of the inner ring in a direction along the first central longitudinal axis, wherein the raised shoulder is configured to cooperate with the first plumbing interface.

* * * * *